United States Patent [19]

Nagashima et al.

[11] Patent Number: 4,642,659

[45] Date of Patent: Feb. 10, 1987

[54] IMAGE BUILDING APPARATUS

[75] Inventors: Masayoshi Nagashima, Chigasaki; Tomohiko Takahashi, Tokyo; Naoto Higure, Tokyo; Kanehiro Fukuda, Tokyo, all of Japan

[73] Assignee: Kabushiki Kaisha Toshiba, Japan

[21] Appl. No.: 706,282

[22] Filed: Feb. 27, 1985

[30] Foreign Application Priority Data

Feb. 29, 1984 [JP] Japan .................................. 59-37775

[51] Int. Cl.$^4$ .............................................. G01D 15/10

[52] U.S. Cl. ................................ 346/76 PH; 346/105; 400/120; 400/618

[58] Field of Search .................. 346/76 PH, 105, 136, 346/139 R; 400/618, 420; 219/216 PH

[56] References Cited

U.S. PATENT DOCUMENTS 4,532,524 7/1985 Yana et al. ...................... 346/78 PH

FOREIGN PATENT DOCUMENTS 0099957 12/1983 European Pat. Off. .

*Primary Examiner*—Arthur G. Evans

*Attorney, Agent, or Firm*—Finnegan, Henderson, Farabow, Garrett & Dunner

[57] ABSTRACT

The improved image building apparatus is constructed such that recording medium, that is, recording paper, is normally introduced into the image building section with a thermal head or the like component incorporated therein while it is stretched under the effect of a certain intensity of braking force which is exerted on the recording paper from the rear side as seen in the direction of transportation thereof. This causes an occurrence of such a malfunction as skewing, loosening or the like of the recording paper to be inhibited at least in the image building section. Thus, image building can be achieved without incorrect registering, deformation or the like recognized with the printing paper on which image transference has been carried out. To exert such braking force on the recording paper, there may be provided a clamping member for clamping the recording paper therebetween with a certain intensity of frictional force exerted on the latter, a stopper for limiting the freedom of rotation of roller or the like which serves to introduce the recording paper into the image building section while the roller or the like rotates as a follower roller in accordance with transportation of the recording paper.

15 Claims, 16 Drawing Figures

IMAGE BUILDING APPARATUS

BACKGROUND OF THE INVENTION

The present invention relates to an apparatus for building an image by transferring a coloring agent from transfer material to a material to be image transferred.

To facilitate understanding of the invention a typical conventional image building apparatus of the above-mentioned type will be schematically illustrated by way of a fragmental side view in FIG. 1. Referring to FIG. 1, the apparatus includes a paper feeding cassette 1 in which a number of cut papers P are received in the layered structure. In the illustrated example the aforesaid material to be image transferred is each of the cut papers P. As the paper feeding roller 2 is rotated, cut papers P are taken out of the cassette 1 one by one and the foremost end of the thus taken cut paper P reaches a pair of aligning rollers 3*a* and 3*b* by means of which it is arranged correctly. Thereafter, as both the aligning rollers 3*a* and 3*b* are rotated, it is delivered away from them to reach the gate 4 as identified by a solid line. While it is guided by means of the gate 4, it is introduced into the space as defined between the platen roller 5 and the pinch roller 6*a* so that it is transported further as the platen roller 5 is rotated. At this moment a thermal head 10 on the turnable holder 9 secured to a solenoid 8 is caused to turn about the shaft 11 in the anticlockwise direction whereby the thermal head 10 is displaced away from contact with the platen roller 5. It should be noted that the solenoid 8 is turned on at a time when the foremost end of cut paper P is detected by means of a detector 7 which is located in the vicinity of the outlet side of the aligning rollers 3*a* and 3*b*. Next, the platen roller 5 is rotated further while the pinch rollers 6*a* and 6*b* rotate in cooperation with the platen roller 5 in the form of follower rollers. As a result, the cut paper P moves forward until its foremost end in clamped between the platen roller 5 and the pinch roller 6*b* as illustrated in FIG. 2(A). Thereafter, the gate 4 is turned in the anticlockwise direction so that loosening of the cut paper P between both the pinch rollers 6*a* and 6*b* is eliminated. Thus, the cut paper P is brought in close contact with the platen roller 5, as illustrated in FIG. 2(B). Thereafter, the gate 4 is turned again in the clockwise direction until the original position is restored. At this moment the solenoid 8 is turned off and thereby the thermal head 10 is caused to turn again in the clockwise direction about the shaft 11 until both the cut paper P and the transfer material, for instance, thermal transfer type ink ribbon R (hereinafter referred to simply as ink ribbon) come in pressure contact with the platen roller one above another, as illustrated in FIG. 2(C). While the above-mentioned operational state is maintained, the platen roller 5 is rotated further whereby transference of a coloring agent is achieved by means of the thermal head 10.

After completion of printing operation on the cut paper P the latter is carried away from the working area toward the paper discharge tray 14 via a paper discharging roller 13, while its upward movement is guided by an opposing pair of guides 12*a* and 12*b* (see FIG. 1). It should be noted that the platen roller 5 stops the rotation when its rearmost end part of the cut paper P is firmly clamped between the platen roller 5 and the pinch roller 6*a*. On the other hand, the thermal head 10 is caused to turn about the shaft 11 in the anticlockwise direction under the effect of energization of the solenoid 8 and thereby it is displaced away from the platen roller 5. This causes the cut paper P and the ink ribbon R to come out of pressure contact with the platen roller 5, as illustrated in FIG. 2(D) and thereafter only the cut paper P can be transported backwardly as the platen roller 5 is rotated in the opposite direction. At this moment the gate 4 is actuated to turn in the anticlockwise direction (to the position shown by the dashed line of FIG. 1) so that the cut paper P is transported away from the platen roller 5 toward an opposing pair of guides 15*a* and 15*b*. Then, it is transported in the rightward direction as seen in the drawing while it is guided by means of the guides 15*a* and 15*b*. When the foremost end of the cut paper P is restored to its initial position as illustrated in FIG. 2(A), the platen roller 5 stops its rotation and the gate 4 is then turned in the clockwise direction until it resumes the original position as illustrated in FIG. 2(A). Thereafter, by repeating the steps of operations as described above, superimposed printing or transference of various kinds of coloring agents from the ink ribbon R is achieved for the cut paper P. The same steps of operations as described above are repeated further for a plurality of cut papers. After completion of superimposed printing or transference of various coloring agents from the ink ribbon R, cut papers P are carried away on the paper discharging tray 14 on which they are stored in the layered structure.

It should be added that superimposed printing or transfering is usually carried out by using three colors comprising yellow, magenta, cyan or four colors comprising yellow, magenta, cyan and black. FIG. 3 shows an example of ink ribbon to be used for superimposed printing or transfering using four kinds of coloring agents. In FIG. 1, the ink ribbon is identified by reference letter R and arrangement is made such that the ink ribbon R is unreeled from a spool 16 and it is then reeled about another spool 17 via a plurality of guide rollers 18*a*, 18*b*, 18*c* and 18*d*. The reeling spool 17 is adapted to rotate in synchronization with the platen roller 5 and its rotation is stopped at every time when the rearmost end of the ink ribbon R is detected by means of a color detector 19 located in the proximity of the guide roller 18*a* after completion of printing or transfering.

It has been found that the conventional thermal transfer type color printer has serious problems from the viewpoint of structure. One of them is concerned with so-called incorrect registering which tends to take place during superimposed printing or transferring. This incorrect registering refers to the case when the printed or transferred position is located offset from an intended one. In view of minimizing an occurrence of incorrect registering, the platen roller 5 is normally made of rubber and the pinch rollers 6*a* and 6*b* are also made of rubber so as to inhibit slippage of cut paper P. As schematically illustrated in FIG. 4, a phenomenon of local deformation takes place in the pressure contact area where the pinch rollers 6*a* and 6*b* come in pressure contact with the platen roller 5 and the latter comes in pressure contact with the thermal head 10. Due to local deformation of the platen roller 5 and the pinch rollers 6*a* and 6*b*, a radius of the platen roller 5 for determining a distance of transportation of cut paper P with the use of the platen roller 5 (which is generally called effective radius) becomes smaller than the nominal radius r of the platen roller 5. Specifically, the effective radius of the platen roller 5 is reduced to $r_1$ in the pressure contact area where it comes in pressure contact with the thermal head 10 and the same is reduced to $r_2$ in the pressure contact area where the platen roller 5 comes in pressure contact with the pinch rollers 6*a* and 6*b*. For the reasons, the distance of transportation of cut paper P fails to take an amount of $2\pi r$ when the platen roller 5 is rotated by one revolution and thereby the cut paper which has been carried by means of the pinch rollers 6*a* and 6*b*, and the platen roller 5 becomes loosened particularly with respect to the platen roller 5. Once loosening of the cut paper P has occured, prevention of an occurrence of skewing (moving in the inclined state) of the cut paper P owing to frictional force existent between the platen roller 5 and the cut paper P fails to be achieved. As a result, the cut paper P tends to skew in the course of transportation. Unavoidably, incorrect registering takes place in the printing or transferring area.

To obviate the problem of incorrect registering, there was proposed one measure. Specifically, this measure consists in that both the pinch rollers 6*a* and 6*b* are made of the same material in the same dimensions so that they are brought in pressure contact with the platen roller 5 under the condition of the same pressure ($Pa=Pb$) and moreover hardness of rubber constituting the platen roller 5 and pressure Ph of the thermal head 10 adapted to come in pressure contact with the platen roller 5 are selectively determined to adequate values so as to assure that the distance of transportation of the cut paper P is kept constant. However, it has been found that the platen roller 5 and the pinch rollers 6*a* and 6*b* can be fabricated at higher dimensional accuracy only with much difficulty, and therefore incorrect registering in the range of 0.1 to 0.3 mm takes place unavoidably in the printing or transferring area when the conventional method is employed for printing or transferring.

Accordingly, the conventional apparatus as described above has problems that cut paper wound around the platen roller becomes loosened and incorrect registering takes place in the printing or transferring area because of local deformation of the pinch rollers and the platen roller in the pressure contact area, irregular distribution of contact pressure, and reduced dimensional accuracy of parts and components constituting the apparatus.

SUMMARY OF THE INVENTION

Thus, the present invention has been made with the foregoing background in mind and its object resides in providing an improved image building apparatus which assures that a required image is built or recorded on material to be image transferred mostly in the form of cut paper without any occurrence of incorrect registering, deformation of printed or transferred image or the like as is often seen with the conventional thermal transfer type color printer as described above.

To accomplish the above object there is proposed according to the invention an improved image building apparatus of the type including transportating means for transporting recording medium and an image building section where a required image is built and recorded on the recording medium while the latter is transported, wherein the improvement comprises braking means for exerting braking force B on the recording medium from the rear side of the image building section with the use of the transporting means while the latter is transporting the recording medium under the following operative condition:

$$A > B$$

where A represents transporting force required for transportation of the recording medium.

According to the invention, the recording medium is normally kept in the properly stretched state at least in the image building area without an occurrence of loosening. Thus, building and recording of a required image are carried out in the image building or recording position without incorrect registering, deformation of built or recorded image or the like recognized with the recording medium.

The apparatus of the invention is constructed in the comparatively simple manner such that building or recording of an image on the moving recording medium is achieved in the image building or recording position without incorrect registering, deforming of built or recorded image or the like.

Therefore, when the present invention is applied to a color printer in which superimposed transference is carried out on the reciprocably moving recording medium (material to be image transferred) by using a plurality of coloring agents, there does not take place any incorrect registering in the superimposed printing or transfering position. As a result, a beautiful image can be obtained. It should of course be understood that the present invention should not be limited only to such a color printer as described above but it may be applied to any type of mono-color printer with the same advantageous features assured.

Other objects, features and advantages of the invention will become more clearly apparent from reading of the following description which has been prepared in conjunction with the accompanying drawings.

BRIEF DESCRIPTION OF THE DRAWINGS

The accompanying drawings will be briefly described below.

DESCRIPTION OF THE PREFERRED EMBODIMENTS

Now, the present invention will be described in a greater detail hereunder with reference to the accompanying drawings which illustrate a few preferred embodiments thereof.

First, description will be made as to an apparatus according to the first embodiment of the invention with reference to FIGS. 5(A), 5(B) 6(A) and 6(B).

Figure 5A:
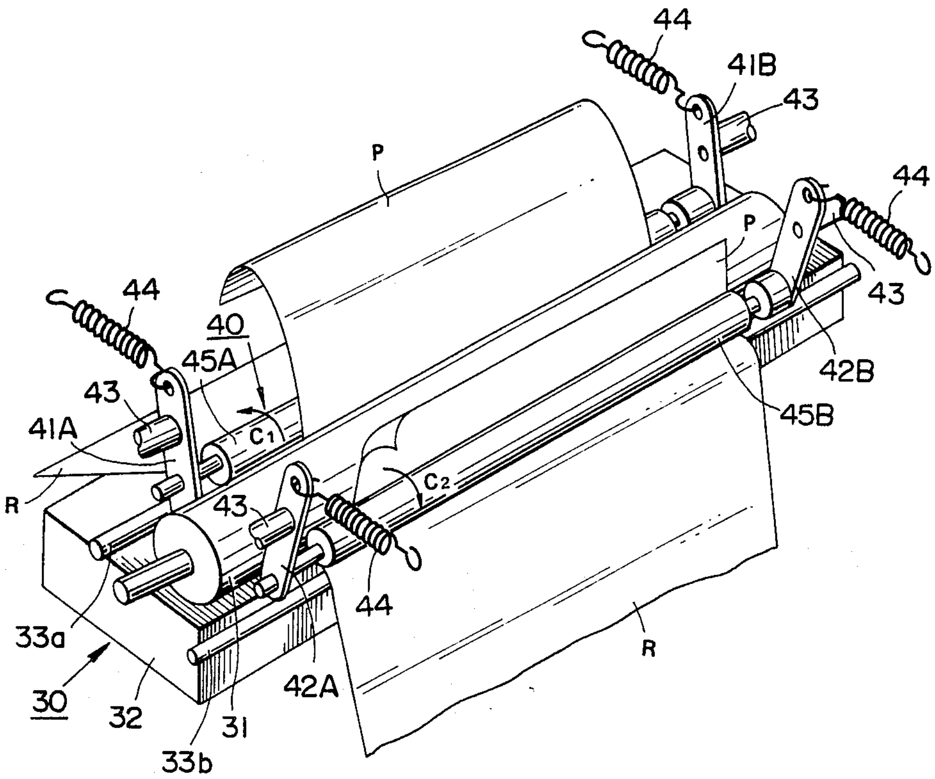
FIG. 5(A) is a perspective view of an image building apparatus in accordance with the first embodiment of the invention.

FIG. 5(A) is a perspective view of the apparatus and FIG. 5(B) is a cross-sectional view of the same taken in a plane where rollers extend in the traverse direction. Both the drawings illustrate the structure of essential components constituting the apparatus.

In FIG. 5(A), a section as identified by reference numeral 30 constitutes a transfer section which includes a platen roller 31 rotatably supported on a frame to rotate in both the directions by means of a driving system which is not shown in the drawing and a thermal head 32 disposed opposite to the platen roller 31 to move toward and away from the latter. It should be noted that the platen roller 31 is normally constructed in the form of a rubber roller of which surface hardness is predetermined to a specific level.

Arrangement is made such that a transfer material R such as ink ribbon or the like material is continuously fed through the space as defined between the platen roller 31 and the thermal head 32 with the aid of guide rollers 33*a* and 33*b*. Usually, the ink ribbon R used for the apparatus is designed in a tape having three or four color sections arranged in series in the direction of extension of the tape. In the case of an ink ribbon including three color sections in the equally spaced relation, the first section is coated with yellow thermally fusible or vaporizable ink, the second one is coated with magenta thermally fusible or vaporizable ink, and the third one is coated with cyan thermally fusible or vaporizable ink. On the other hand, in the case of an ink ribbon including four color section in the equally spaced relation, the first section is coated with yellow thermally fusible or vaporizable ink, the second one is coated with magenta thermally fusible or vaporizable ink, the third one is coated with cyan thermally fusible or vaporizable ink and the fourth one is coated with black thermally fusible or vaporizable ink.

Further, transporting sections 40 are provided on both the sides of the transfer section 30 to introduce into the space as defined between the platen roller 31 and the thermal head 32 a paper P to be image transferred, for instance, cut paper on which an image is built by thermally transferring a predetermined coloring agent coated on the ink ribbon R.

Next, description will be made below as to the structure of the transporting section 40.

In FIGS. 5(A) and (B) reference numerals 41A, 41B, 42A and 42B designate a swing lever respectively which is located in the proximity of both the ends of the platen roller 31. The central part of each of the swing levers 41A, 41B, 42A and 42B is pivotally supported by means of a pin 43 and the one end part of the lever is turnably displaced under the effect of resilient force of a coil spring 44, while the other end of the same is turnably displaced toward the platen roller by turning movement of the one end of the lever in that way. The swing levers 41A and 41B and the swing levers 42A and 42B pivotally support a pair of clamping rollers in the form of a follower roller at their lower end parts which comprises a first pinch roller 45A and a second pinch roller 45B with the aid of radial bearings 46 fitted thereto, as will be best seen in FIG. 5(B), so that a cut paper P wound about the platen roller 31 is firmly clamped between the latter and the pinch rollers 45A and 45B. In the illustrated embodiment, the radial bearings are employed for the apparatus but it should be understood that the present invention should not be limited only to this but journal bearings or the like means may be employed as bearing members. Further, it should be noted that the frictional coefficient which appears between the pinch rollers 45A and 45B and the cut paper P is determined lower than that between the cut paper P and the platen roller 31. To this end, each of the pinch rollers 45A and 45B is lined with a contact layer around the peripheral surface thereof, the contact layer being adapted to contact with the cut paper P and having at least a characterizing feature of non-adhesiveness against coloring agent (ink) on the ink ribbon R. Fluoride based resin, silicon rubber or the like material having non-adhesiveness is preferably employable as material for the layer structure of contact surface.

As illustrated in FIG. 5(B), the first pinch roller 45A is provided with a first one-way rotation limiting member 48A in the form of one-way clutch or the like means so as to allow it to rotate only in the one direction, for instance, in the direction as identified by an arrow mark $C_1$ in FIG. 5(B), and the first one-way rotation limiting member 48A is disposed in the bearing area as defined between the lower part of the swing lever 41B and the journal of the first pinch roller 45A. In the same way, the second pinch roller 45B is provided with a second one-way rotation limiting member 48B in the form of one-way clutch or the like means so as to allow it to rotate only in the different direction from that in the case of the first pinch roller 45A, for instance, in the direction as identified by an arrow mark $C_2$ in FIG. 5(B)

and the second one-way rotation limiting member 48B is disposed in the bearing area as defined between the lower part of the swing lever 42B and the journal of the second pinch roller 45B.

Figure 1:
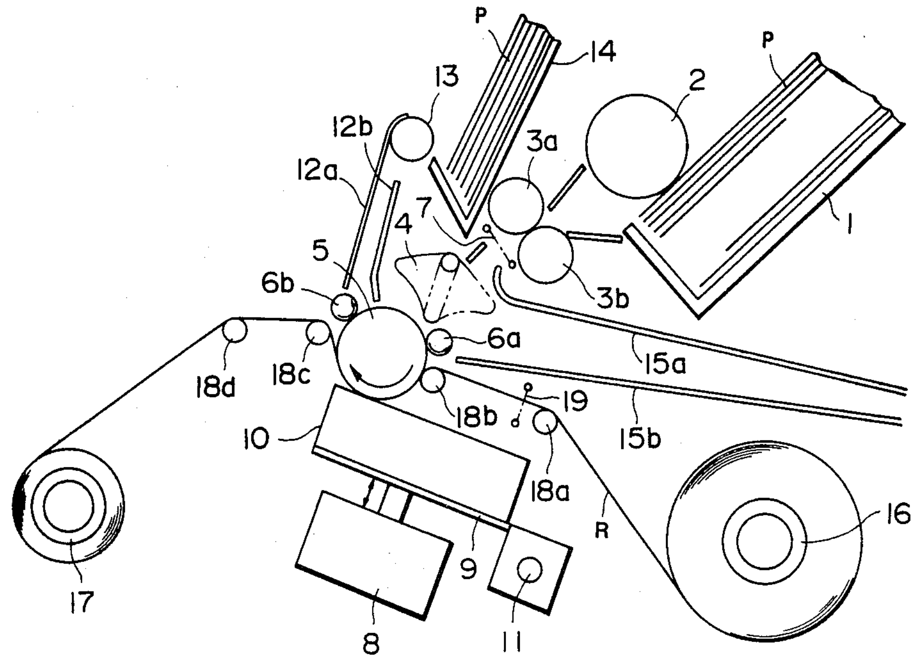
FIG.1 (PRIOR ART)
FIG. 1 is a schematic side view of a conventional image building apparatus, particularly illustrating how parts and components constituting the apparatus are arranged therein.
Figure 2A:
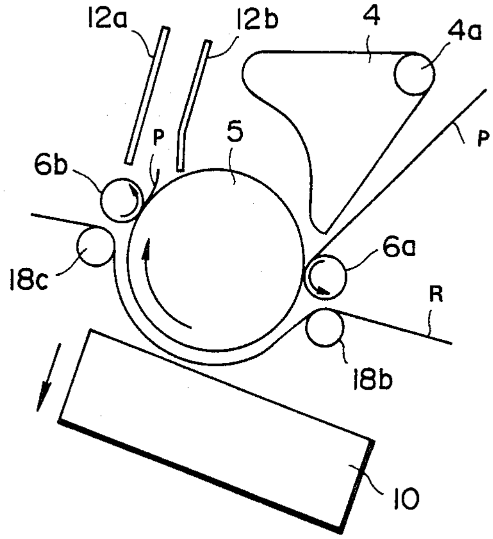
FIG.2(A) (PRIOR ART)
FIGS. 2(A) to (D) are enlarged fragmental side views of the conventional apparatus respectively, particularly illustrating how cut paper is transported through the apparatus.
Figure 2B:
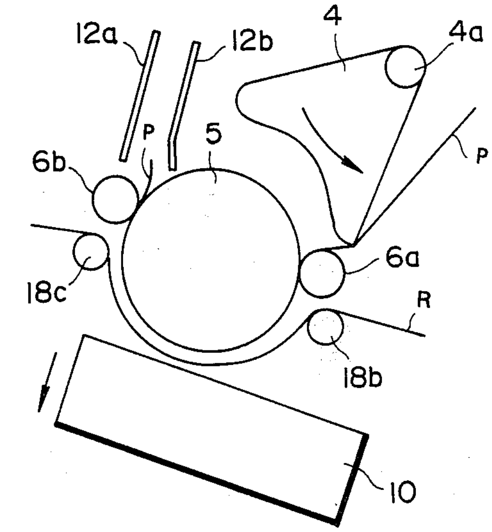
FIG.2(B) (PRIOR ART)
Figure 2C:
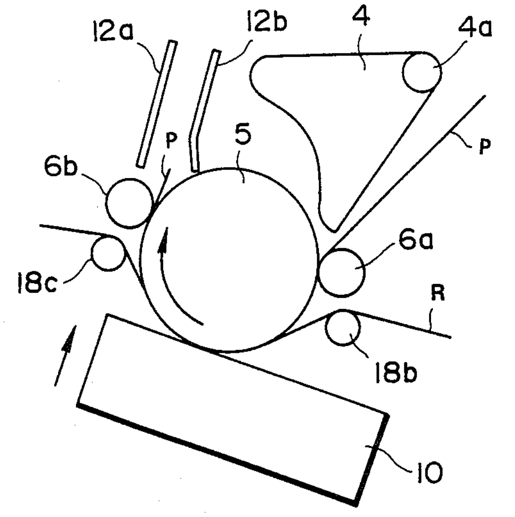
FIG.2(C) (PRIOR ART)
Figure 2D:
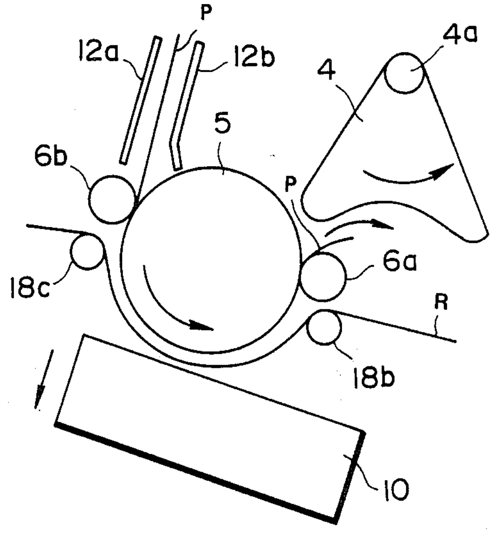
FIG.2(D) (PRIOR ART)
Figure 3:
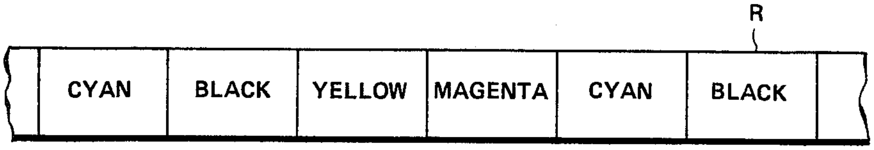
FIG. 3 is a schematic plan view of a typical ink ribbon including a number of blocks arranged one after another in the longitudinal direction of the ink ribbon, each of the blocks including four coloring sections in the equally spaced relation on which four kinds of coloring agents are coated.
Figure 4:
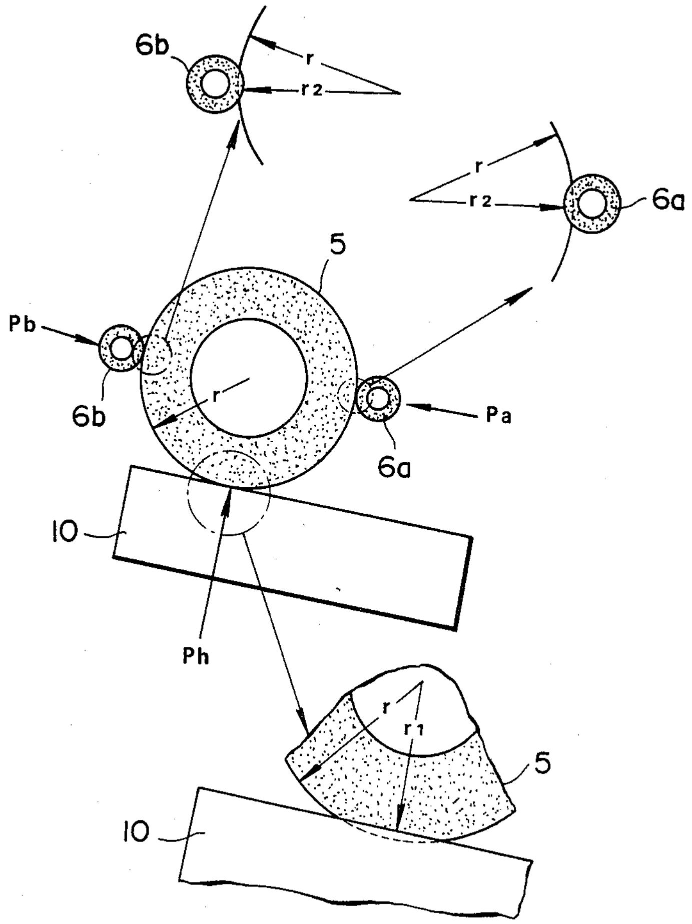
FIG. 4 is an enlarged fragmental side view of the apparatus, particularly illustrating how the platen comes in contact with the thermal head and how the pinch rollers come in contact with the platen roller or out of the contact with the latter.

Since other parts or components constituting the apparatus of the invention rather than the above-mentioned ones do not form any part of the invention and their typical structure is as illustrated in FIG. 1, their repeated description will not be required any longer.

Next, operation of the apparatus according to the illustrated embodiment will be described below with reference to FIGS. 6(A) and (B).

Figure 6:
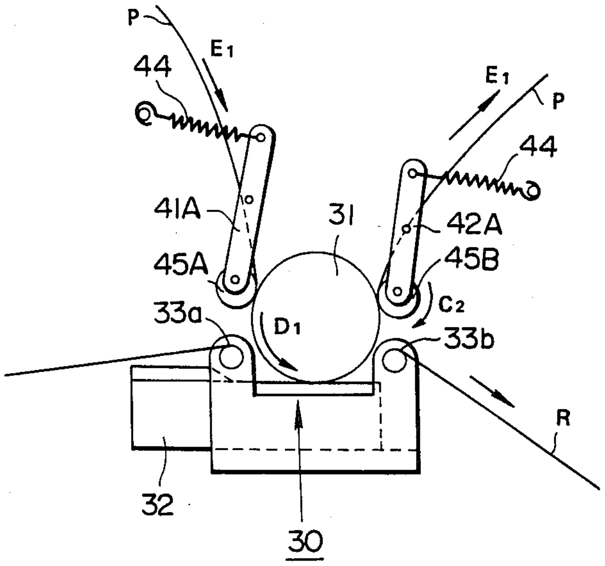
FIG. 6(A) is a fragmental schematic side view of the apparatus in accordance with the first embodiment, particularly illustrating how cut paper is transported forwardly during the step of transference of coloring agents.
FIG. 6(B) is a fragmental schematic side view of the apparatus similar to FIG. 6(A), particularly illustrating how cut paper is transported backwardly with the thermal head displaced away from the platen roller.
Figure 6:
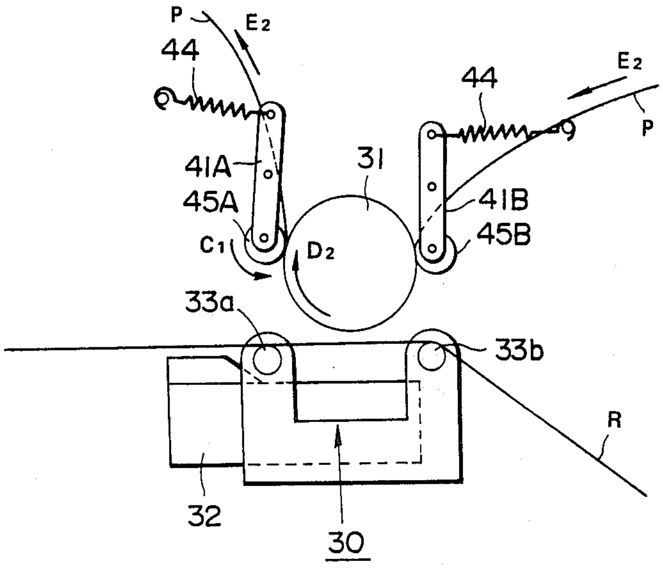

FIG. 6(A) is a fragmental schematic side view of the apparatus, particularly illustrating how cut paper P is transported during the step of forward movement while the apparatus is operated to transfer an image onto the cut paper P. As the latter is supplied into the apparatus, the swing lever 41A is parted away from the surface of the platen roller 31 by means of a driving mechanism such as plunger type solenoid or the like means before the foremost end of cut paper P as seen in the direction of transportation reaches the contact area between the first pinch roller 45A and the platen roller 31. Thus, the cut paper P is transported further without any particular hindrance encountered and it is then caused to enter the area as defined between the platen roller 31 which is rotated in the direction as identified by an arrow mark $D_1$ and the second pinch roller 45B which is rotated in the form of a follower roller in the direction as identified by an arrow mark $C_2$ while they are brought in pressure contact with one another. As a result, the cut paper P is clamped between them. Thereafter, the swing lever 41A is restored to the initial position as illustrated in FIG. 6(A) by actuating the driving mechanism such as plunger type solenoid or the like means whereby the first pinch roller 45A comes in pressure contact with the platen roller 31 with the cut paper P interposed therebetween.

When the platen roller 31 is rotated in the direction as identified by an arrow mark $D_1$ after the abovementioned operational state is assumed, the second pinch roller 48B is allowed to follow rotation in the direction as identified by an arrow mark $C_2$ with the aid of the second one-way clutch 48B and thereby the part of cut paper P which has been clamped between the second pinch roller 45B and the platen roller 31 can be transported in the direction as identified by an arrow mark $E_1$. On the other hand, since the first pinch roller 45A includes the first one-way clutch 48A which serves to inhibit the former from being rotated in the opposite direction to that identified by an arrow mark $C_1$ (That is, in the direction of following of rotation of the platen roller 31), it results that a braking force is developed between the platen roller 31 and the first pinch roller 45A mainly due to frictional force produced therebetween, and it is then transmitted to the cut paper P which has been transported in the direction as identified by an arrow mark $E_1$. The braking force causes the cut paper P to be properly stretched in the working area between both the pinch rollers 45A and 45B whereby the cut paper P is transported in the direction as identified by an arrow mark $E_1$ without any occurrence of loosening while it is brought in close contact with the platen roller 31. As described above, the frictional coefficient between the cut paper P and both the pinch rollers 45A and 45B is determined lower than that between the cut paper P and the platen roller 31, and therefore there is no possibility of causing slippage of the cut paper P relative to the platen roller 31 in the working area between the second pinch roller 45A and the platen roller 31 due to the existence of braking force caused by the first pinch roller 45A. Thus, the cut paper P can be transported at substantially the same constant speed as the peripheral speed of the platen roller 31 which is normally rotated. Now, a first transference of coloring agent to the cut paper is ready to be carried out by means of the thermal head 32 in the course of transportation of the cut paper P in that way under the properly tensioned state.

FIG. 6(B) is a fragmental schematic side view of the apparatus, particularly illustrating how cut paper P is transported during the step of return movement. To assure that the cut paper P is transported backwardly to the position where a second transference of coloring agent is initiated after completion of the first transference of coloring agent in the above-described manner, the platen roller 31 is rotated in the direction as identified by an arrow mark $D_2$ in FIG. 6(B). At this moment, the part of cut paper P which has been clamped between the first pinch roller 45A and the platen roller 31 can be transported in the direction as identified by an arrow mark $E_2$ in the drawing, because the first pinch roller 45A is allowed to follow rotation in the direction as identified by an arrow mark $C_1$ owing to the arrangement of the first one-way clutch 58A. On the other hand, since the second pinch roller 45B is inhibited from rotation in the opposite direction to that identified by an arrow mark $C_2$ due to the existence of the second one-way clutch 48B, a braking force attributable to frictional force is exerted on the cut paper P to be transported in the direction as identified by an arrow mark $E_2$ in FIG. 6(B), while the cut paper P is supported around the platen roller 31. The braking force causes the cut paper P to be properly stretched in the working area between both the pinch rollers 45A and 45B. Thus, the cut paper P can be transported in the direction as identified by an arrow mark $E_2$ without any occurrence of loosening while it is brought in close contact with the platen roller 31. Also, in this case there takes place no slippage of cut paper P relative to the platen roller 31 between the first pinch roller 45A and the platen roller 31 for the same reason as mentioned above. Thus, the cut paper P is transported at substantially the same speed as the peripheral speed of the platen roller 31 which is normally rotated.

When the cut paper P resumes the position where transference of coloring agent is initiated again, the next operation of transference of coloring agent is carried out by way of the steps which have been described above with reference to FIG. 6(A). Subsequent to the second transference operation, other transference operations are repeated a predetermined number of times until all coloring agents are transferred to cut paper P and a required image is built thereon.

As will be readily understood from the above description, the apparatus according to the first embodiment of the invention assures that cut paper P held between the pinch rollers 45A and 45B, and the platen roller 31 is properly stretched without any occurrence of loosening, and thereby it is brought in close contact with the platen roller 31. Thus, any occurrence of incorrect registering of cut paper P during multi-colored transference such as superimposed transference or the like operation is inhibited reliably.

Another advantageous feature of the apparatus of the invention is that there does not take place such a malfunction as sticking of coloring agent to the pinch rollers, contamination of cut paper with coloring agent, incorrect building of image or the like even at a time when rotation of the pinch rollers 45A or 45B is braked by means of the one-way clutches 48A and 48B, because both the pinch rollers 45A and 45B are lined with a layer of material having a chemical property of non-adhesiveness with respect to the employed coloring agent. Fluoride based resin, silicon rubber or the like material are preferably employed for the surface layer structure on the pinch rollers.

In the above-described embodiment of the invention, the apparatus is constructed such that the transporting section 40 is equipped with pinch rollers in conformance with the manner of structure of the conventional apparatus as illustrated in FIG. 1. Alternatively, the pinch rollers may be replaced with endless belt adapted to follow rotation of the platen roller while it is kept in the stretched state. Further, in the illustrated embodiment a pair of pinch rollers are employed for the apparatus but the present invention should not be limited only to this. Alternatively, more than two pinch rollers may be arranged in the equally spaced relation around the center axis of rotation. In the last mentioned case, more uniform pressure contact is achieved between the pinch rollers and the platen roller. As a result, an occurrence of such a malfunction as skewing or the like caused with respect to cut paper to be transported while it is firmly held therebetween is prevented more reliably.

Further, in the above-described embodiment the apparatus is constructed such that a one-way clutch is mounted only on the one side of each of the pinch rollers 45A and 45B. Alternatively, one-way clutches can be mounted on both the sides of the pinch rollers. The arrangement of the one-way clutches made in this way assures that power exerted on cut paper P by both the end parts of the pinch rollers 45A and 45B can be controlled more uniformly, resulting in transportation of the cut paper P being carried out stably. It should be added that there is no fear of causing local wearing over the whole length of the pinch rollers 45A and 45B.

Figure 5:
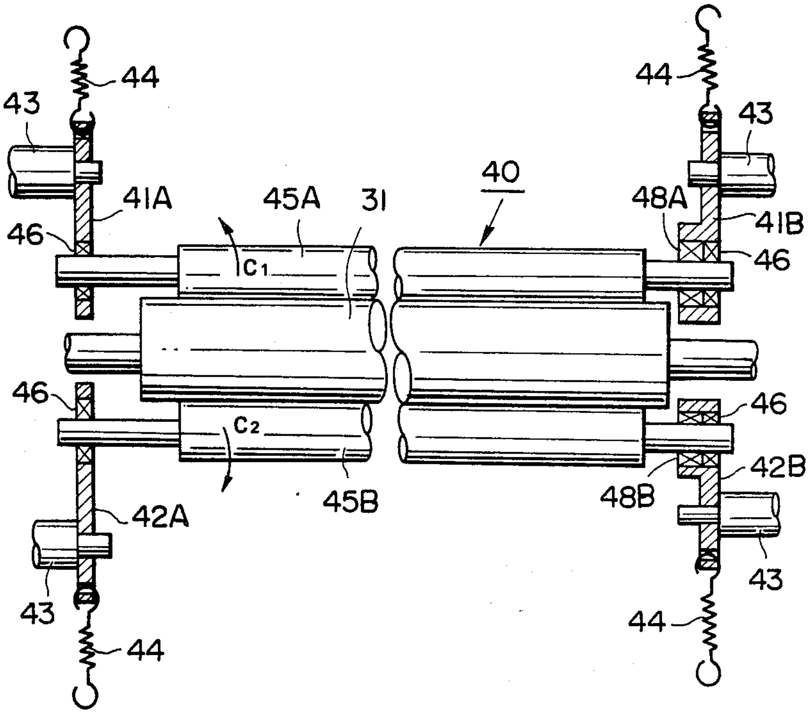
FIG. 5(B) is a fragmental cross-sectional view of the apparatus in FIG. 5(A) taken along a plane extending through the center axes of the platen roller and the pinch rollers.
Figure 7A:
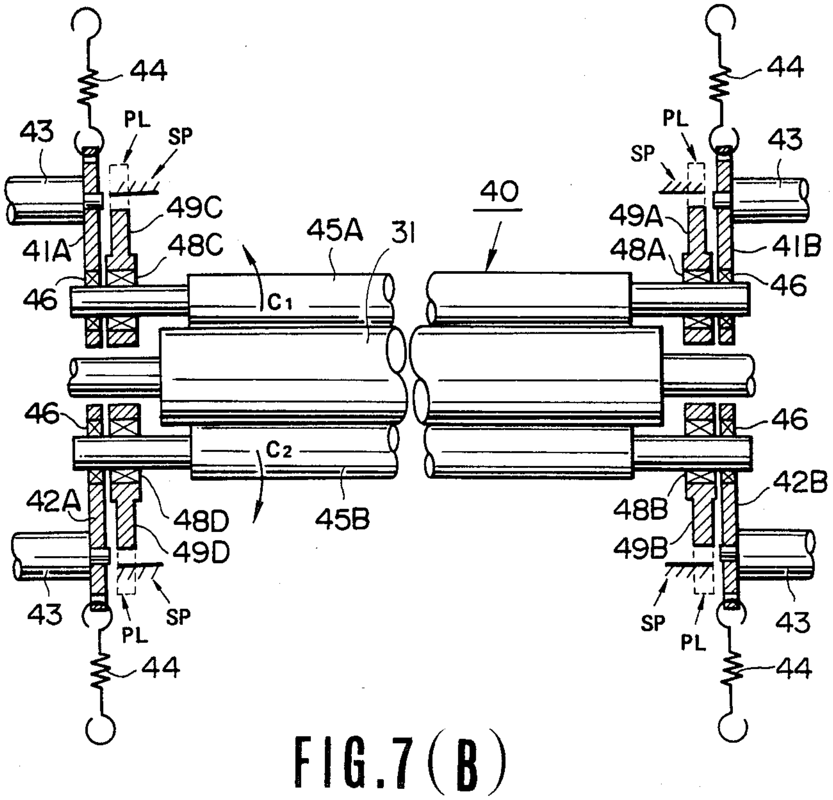
FIG. 7(A) is a fragmental cross-sectional view of an image building apparatus in accordance with the second embodiment of the invention taken along a plane extending through the center axes of the platen roller and the pinch rollers.

Next, FIGS. 7(A) and (B) schematically illustrate an apparatus according to the second embodiment of the invention, wherein in this embodiment essential parts or components constituting the apparatus are adequately modified from those in the first embodiment of the invention in the improved manner. Incidentally, same or similar parts or components in FIG. 7 as those in FIG. 5 are identified by same reference numerals.

Figure 7B:
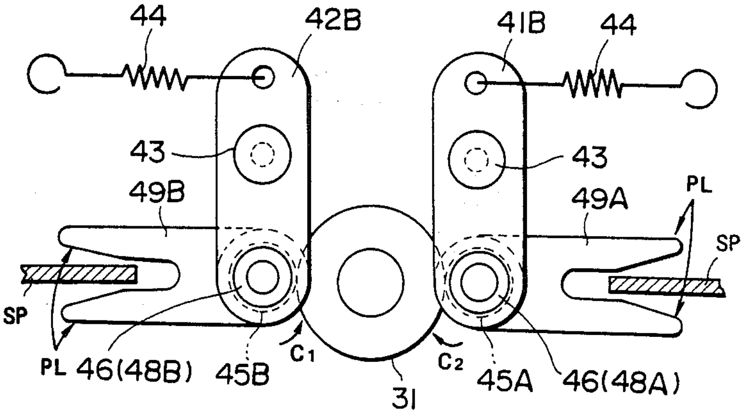
FIG. 7(B) is a fragmental schematic side view of the apparatus in FIG. 7(A), particularly illustrating the operational relation among the components constituting the apparatus.

As is apparent from FIG. 7(A) which is a fragmental cross-sectional view of the apparatus taken in a plane extending along the axis lines of rollers, the apparatus according to the second embodiment consists in that one-way clutches 48A, 48B, 48C and 48D are provided separate from swing levers 41B, 42B, 41A and 42A and the former are fitted into housings 49A, 49B, 49C and 49D. (It should be noted that in this embodiment four one-way clutches are mounted on both the sides of the pinch rollers 45A and 45B, but the present invention should not be limited only to this and a single one-way clutch may be mounted merely on the one side of each of the pinch rollers 45A and 45B without any departure from the spirit of the invention.) As illustrated in FIG. 7(B) which is a side view of the housings 49A, 49B, 49C and 49D, the one way clutches 48A, 48B, 48C and 48D are fixedly fitted into the one end part of the housings 49A, 49B, 49C and 49D and two pawls PL adapted to be operatively engaged to a stopper SP constituting a part of the frame are formed at the other end part of the same so as to inhibit an occurrence of idle rotation of the one-way clutches 48A, 48B, 48C and 48D in the direction of limiting of rotation. Since the apparatus is constructed in the above-described manner, the pinch rollers 45A and 45B are allowed to rotate in the directions as identified by arrow marks $C_1$ and $C_2$ in the drawing but they are inhibited from rotation in the opposite direction to those as identified by arrow marks $C_1$ and $C_2$ in substantially the same manner as in the case of the first embodiment.

Specifically, the apparatus according to the second embodiment is intended to inhibit an occurrence of disengagement of the pinch rollers away from cut paper P or the platen roller 31. It should be noted that the aforesaid disengagement is attributable mainly to the facts that the pinch roller located on the side where braking force is exerted on cut paper P tends to move away from the platen roller 31 and more particularly some part of the frictional force developed between cut paper P which has been transported as the platen roller 31 is rotated and the pinch roller of which rotation in the predetermined direction is inhibited by means of one-way clutch reacts against forcible transportation of the cut paper P whereby there is produced a moment which is active for displacing the pinch roller away from the cut paper P and the platen roller 31. As mentioned above, the one-way clutches 48A, 48B, 48C and 48D are disposed separately from the swing levers 41B, 42B, 41A and 42A and thereby the aforesaid moment is effectively absorbed between the pinch roller and the swing lever. As a result, an occurrence of phenomenon of disengagement as described above is inhibited satisfactorily.

For instance, in the case of the apparatus as illustrated in FIG. 7(B), moment absorption efficiency can be maximized when the parts and components as illustrated in the drawing are arranged such that a straight line extending through the axis of the platen roller 31, the axis of the pinch roller 45A (or 45B) and the stopper SP is intersected with a straight line extending through the axis of the pinch roller 45A (or 45B) and the center of a pin 43.

In the second embodiment of the invention as illustrated in FIGS. 7(A) and (B), each of the pawls PL on the housings 49A, 49B, 49C and 49D is caused to come in engagement with the stopper SP constituted by a part of the frame. However, the present invention should not be limited only to this. Alternatively, arrangement may be made such that each of the pawls PL is operatively engaged to the shaft of the platen roller 31. Also, in the last mentioned case the same functional effects as in the case of the foregoing embodiment are obtainable.

Next, description will be made below as to the apparatus according to the third embodiment of the invention.

Figure 8:
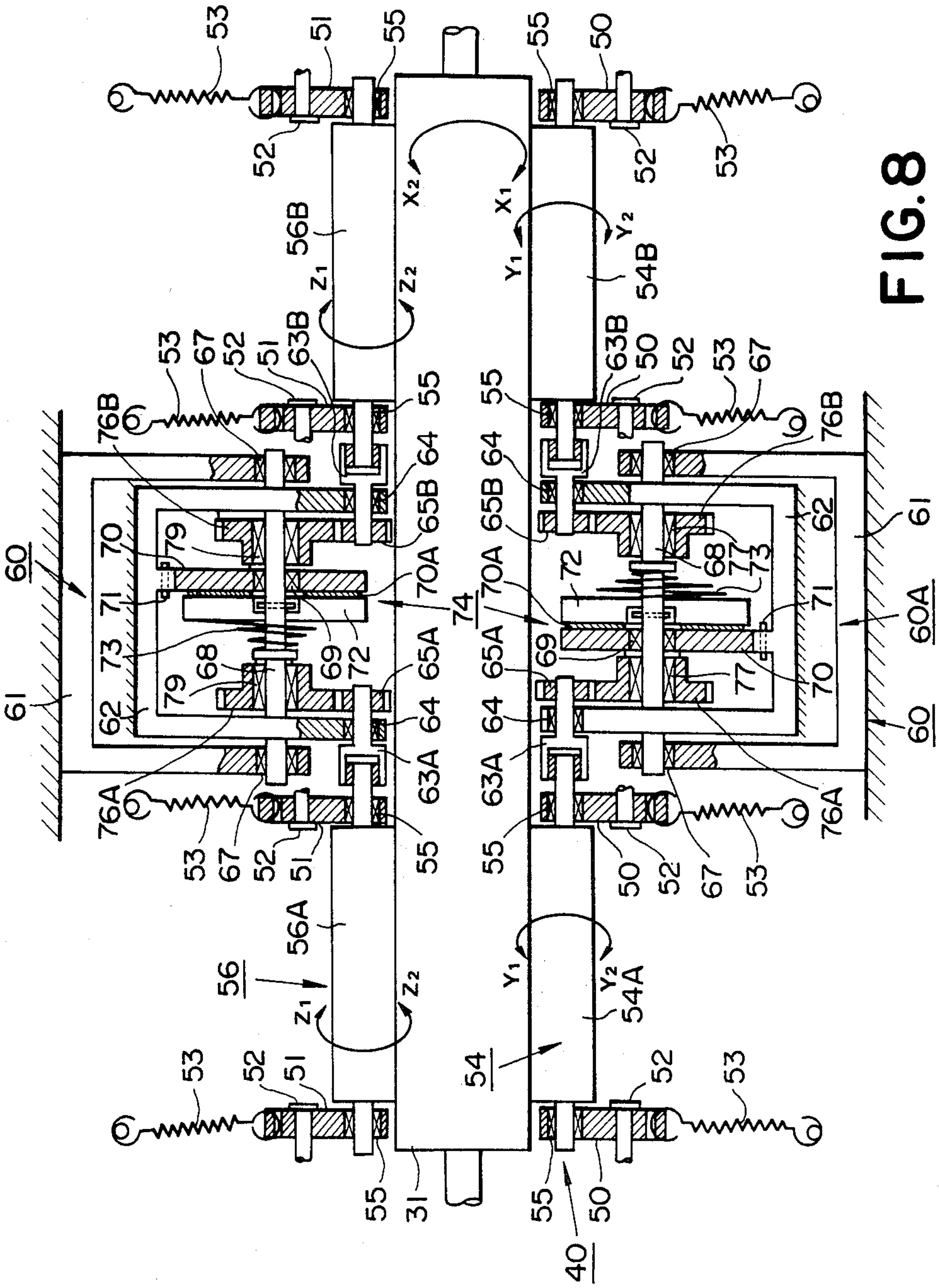
FIG. 8 is a fragmental cross-sectional view of an image building apparatus in accordance with the third embodiment of the invention taken along a plane extending through the center axes of the platen roller and the pinch rollers.

FIG. 8 is a fragmental cross-sectional view of the apparatus taken in a plane extending along the axis lines of rollers, wherein same or similar parts or components in FIG. 8 as those in the case of the apparatus according to the foregoing embodiments are identified by same reference numerals. Thus, their repeated description will not be required. The apparatus according to the third embodiment is different from that according to the foregoing embodiments only in respect of the structure of the transporting section 40. Now, the structure of the transporting section 40 in the apparatus according to the third embodiment will be described below in more details.

In the drawing, reference numerals 50 and 51 each designate a swing lever respectively. Each of the swing levers 50 and 51 is located on the one side relative to the center of rotation of the platen roller 31, its middle part is turnably supported by means of a pin 52 and its one end part is provided with a spring 53 which serves to energize the swing lever so as to allow the other end part to move toward the platen roller 31 by way of its turning movement.

Pinch rollers 54A and 54B constituting a first group 54 of pinch rollers are rotatably supported on swing levers 50 with the aid of radial bearings 55. Further, pinch rollers 56A and 56B constituting a second group 56 of pinch rollers are rotatably supported on swing levers 51 with the aid of radial bearings 55 in the quitely same manner as in the case of the first group of pinch rollers. Specifically, the first group 54 of pinch rollers and the second group 56 of pinch rollers are merely an example of a pair of clamping rollers adapted to rotate in the form of follower roller as cut paper partially wound around the platen roller 31 is transported. It should be noted that the surface of each of the pinch rollers 54A, 54B, 56A and 56B has a high frictional coefficient which appears when it comes in contact with cut paper P.

Further, the transporting section 40 includes a braking mechanism 60 which is constructed such that the one group of pinch rollers located forwardly of the direction of transportation of cut paper are caused to rotate as idle roller without any braking force exerted thereon but the other group of pinch rollers are caused to rotate as idle roller with braking force exerted thereon, when cut paper P is reciprocably displaced by means of the platen roller 31, the first group 54 of pinch rollers and the second group 56 of pinch rollers.

In the illustrated embodiment, the braking mechanism 60 comprises a first braking mechanism 60A and a second braking mechanism 60B in the form of a pair, wherein the first braking mechanism 60A is arranged for the group 54 of pinch rollers and the second braking mechanism 60B is arranged for the group 56 of pinch rollers in the substantially same structure as that of the former.

Now, the structure of the first braking mechanism 60A will be typically described below in more detail. In FIG. 8 reference numerals 61 and 62 each designate a bracket respectively which is fixedly secured to a frame which is not shown in the drawing.

The bracket 62 rotatably carries coupling shafts 63A and 63B with the aid of radial bearings 64 at both the ends thereof so that the pinch rollers 54A and 54B are operatively connected to the coupling shafts 63A and 63B to rotate together with the latter. Further, the coupling shafts 63A and 63B rotatably carry spur gears 65A and 65B at their innermost end part located inwardly of the bracket 62.

On the other hand, the bracket 61 rotatably carries a shaft 68 with the aid of radial bearings 67. A frictional braking section 74 comprising a frictional disc 70A, a stationary disc 70 of which part is connected to the bracket 62 by way of a pin 71, a rotational disc 72 disposed slidably in the axial direction of the shaft 68 to rotate together with the latter and a biasing member 73 (for instance, compressive coil) adapted to thrust the rotational disc 72 toward the frictional disc 70A is arranged on the shaft 68. It should be added that the stationary disc 70 is inhibited from sliding movement in the axial direction of the shaft 68 but it includes a radial bearing 69 which fitted onto the latter.

Further, the frictional braking section 74 is provided with spur gears 76A and 76B at the position located in the proximity of both the ends thereof and spur gears 76A and 76B are rotatably mounted on the shaft 68 with one-way clutches 77 incorporated therein so that they mesh with the spur gears 65A and 65B on the coupling shafts 63A and 63B. The one-way clutches 77 are designed to transmit to the shaft 68 only rotation of the pinch rollers 54A and 54B which are adapted to rotate in the direction as identified by an arrow mark $Y_1$ as follower roller in response to rotation of the platen roller 31 in the direction as identified by an arrow mark $X_1$ in the drawing. Thus, when rotational force of the pinch rollers 54A and 54B is transmitted to the shaft 68 via the one-way clutches 77, it results that braking force generated by the frictional braking section 74 is exerted on the pinch rollers 54A and 54B. Thus, generated braking force is exerted on both the pinch rollers 54A and 54B in the form of torque which is determined smaller than the torque corresponding to the maximum static frictional force which appears between the pinch rollers 54A and 54B and the cut paper P.

The second braking mechanism 60B is constructed in the same structure as that of the first braking mechanism 60A (same or similar parts or components in the former as those in the latter are identified by same reference numerals and therefore their repeated detailed description will not be required). The only a difference therebetween is that one-way clutches 79 are fitted into the spur gears 76A and 76B on the shaft 68 corresponding to the one-way clutches 77 on the shaft 68 in the first braking mechanism 60A. The one-way clutches 79 are intended to transmit to the shaft 58 only rotation of the pinch rollers 56A and 56B which are adapted to rotate in the direction as identified by an arrow mark $Z_2$ as follower roller in response to rotation of the platen roller 31 in the direction as identified by an arrow mark $X_2$. Thus, when rotational force of the pinch rollers 56A and 56B is transmitted to the shaft 68 via the one-way clutches 79, it results that braking force generated by the frictional braking section 74 is exerted on the pinch rollers 56A and 56B. It should be noted that thus generated braking force is exerted on both the pinch rollers 56A and 56B in the form of torque which is determined smaller than torque corresponding to the maximum static frictional force which appears between the pinch rollers 56A and 56B and the cut paper P.

Obviously, the one-way clutches 77 (one-way clutches 79) employed for the frictional braking section represent merely an example of a rotational force transmitting limiting member which functions in such a manner that rotation of the pinch rollers 54A and 54B (pinch rollers 56A and 56B) fails to be transmitted to the frictional braking section 74 when the pinch rollers 54A and 54B assume the position located forwardly of the direction of transportation of cut paper P and on the contrary, rotation of the pinch rollers 54A and 54B (pinch rollers 56A and 56B) is sucessfully transmitted to the frictional braking section 74 when rotation is effected in the opposite direction.

Next, operation of the apparatus according to the third embodiment of the invention as described above will be described below also with reference to FIGS. 9(A) and (B).

Figure 9A:
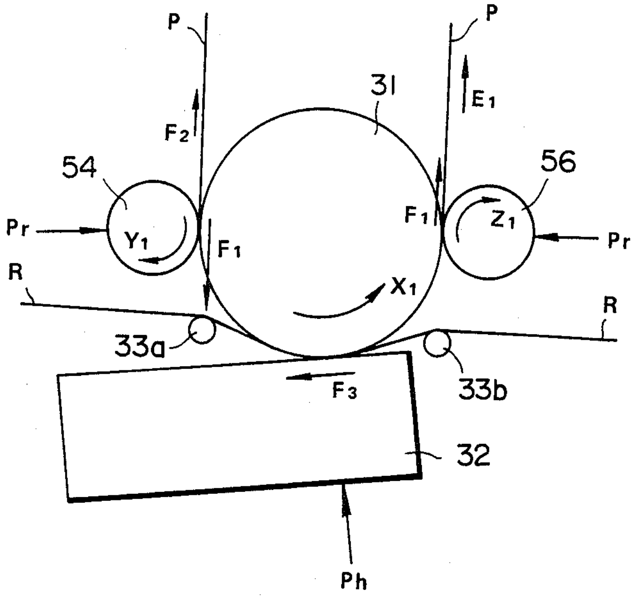
FIG. 9(A) is an enlarged fragmental schematic side view of the apparatus in accordance with the third embodiment of the invention, particularly illustrating how cut paper is transported forwardly with the thermal head held in contact with the platen roller during the step of transference of coloring agents.

FIG. 9(A) is an enlarged fragmental schematic side view of the apparatus, particularly illustrating how cut paper P is transported during the step of forward transportation when image transference is carried out. First, cut paper P is clamped between the first and second groups 54 and 56 of pinch rollers and the platen roller 31 in the substantially same manner as in the case of the first and second embodiments of the invention.

Thereafter, when the platen roller 31 is rotated in the direction as identified by an arrow mark $X_1$, rotation of the second group 56 of pinch rollers in the direction as identified by an arrow mark $Z_1$ adapted to follow rotation of the platen roller 31 fails to be transmitted to the shaft 68 due to the arrangement of the one-way clutches 79 in the second braking mechanism 60B. Thus, frictional transportation force $F_1=\mu Pr$ (where $\mu$: frictional coefficient between the platen roller and the cut paper and Pr: vertically oriented load to be exerted on the cut paper from the platen roller via the groups of pinch rollers) is exerted on the cut paper P. On the other hand, rotation of the first group 54 of pinch rollers in the direction as identified by an arrow mark $Y_1$ adapted to follow rotation of the platen roller in the direction as identified by an arrow mark $X_1$ is transmitted to the shaft 68 via the one-way clutch 77 in the first braking mechanism 60A whereby braking force $F_2$ transmitted from the frictional braking section 74 in the first braking mechanism 60A is exerted to cut paper P via the first group 54 of pinch rollers and moreover frictional transportation force $F_1=\mu Pr$ generated by the platen roller 31 is also exerted on the cut paper P. Since a relation as represented by an inequality $F_1-F_2<F_1$ is established at this moment, it results that the cut paper P is kept in the operative condition under the influence of tension developed between both the groups 54 and 56 of pinch rollers and thereby it is brought in close contact with the peripheral surface around the platen roller 31 without any occurrence of loosening recognized thereon. Thus properly tensioned cut paper P is transported in the direction as identified by an arrow mark $E_1$. Incidentally, the cut paper P kept under the influence of tension is practically affected by frictional resistive force $F_3$ caused due to thrusting force Ph transmitted from the thermal head 32. While the cut paper P is kept in the properly tensioned state, first transference of coloring agent is carried out by means of the thermal head 32 in the course of transportation of cut paper P.

Figure 9B:
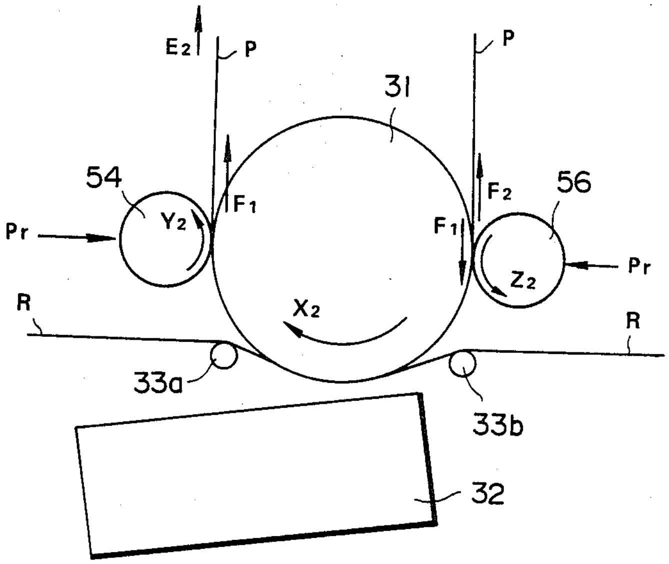
FIG. 9(B) is an enlarged fragmental schematic side view of the apparatus similar to FIG. 9(A), particularly illustrating how cut paper is transported backwardly with the thermal head displaced away from the platen roller.

FIG. 9(B) is an enlarged fragmental side view of the apparatus, particularly illustrating how cut paper P is transported in the opposite direction during the step of backward transportation of cut paper P. On completion of first transfer of coloring agent in that way the platen roller 31 is rotated in the direction as identified by an arrow mark $X_2$ in FIG. 9(B) so as to assure that the cut paper P resumes the position where transference operation is initiated again. At this moment, rotation of the first group 54 of pinch rollers in the direction as identified by an arrow mark $Y_2$ adapted to follow rotation of the platen roller 31 fails to be transmitted to the shaft due to the arrangement of the one-way clutch 77 in the first braking mechanism 60, resulting in frictional transportation force $F_1=\mu Pr$ being exerted on the cut paper P. On the other hand, since rotation of the second group of pinch rollers 56 in the direction as identified by an arrow mark $Z_2$ adapted to follow rotation of the platen roller 31 in the direction as identified by an arrow mark $X_2$ is transmitted to the shaft 68 via the one-way clutch 79 in the second braking mechanism 60B, it results that braking force $F_2$ transmitted from the second braking mechanism 60B is exerted on cut paper P via the second group of pinch rollers 56 and moreover frictional transportation force $F_1=\mu Pr$ transmitted from the platen roller 31 is also exerted on the cut paper P. At this moment, the aforesaid relation as represented by an inequality $F_1-F_2<F_1$ has been established and thereby the cut paper P can be transported in the direction as identified by an arrow mark $E_2$ while it is kept in the tensioned state between both the groups of pinch rollers 54 and 56 without any occurrence of loosening and it is brought in close contact with the peripheral surface of the platen roller 31.

On completion of return of cut paper to the position where transference of coloring agent is initiated again next transference of another coloring agent is carried out by way of the steps of operations as described above with reference to FIG. 9(A). Thereafter, the same steps of operations are repeated until all coloring agents are transferred to cut paper P one by one. As a result, a required image is built.

As described above, the apparatus according to the third embodiement of the invention includes as an essential element the braking mechanism 60 which comprises a frictional braking section 74 and a plurality of one-way clutches 77 and 79 in the form of rotational force transmission limiting member which serves to inhibit rotational force from being transmitted from a plurality of clamping rollers (first and second groups of pinch rollers) to the frictional braking section 74 only in the predetermined direction. Owing to the arrangement of the braking mechanism 60 made in that way, it is assured that cut paper P can be transportated reliably while it is held in the stretched state by means of both the groups of pinch rollers 54 and 56 without any occurrence of loosening, and moreover it is brought in close contact with the peripheral surface of the platen roller 31. Thus, an occurrence of incorrect registering can be prevented during operation of multi-colored transference or superimposed transference.

More specifically, the braking mechanism 60 is constructed in the form of a pair corresponding to both the groups of pinch rollers 54 and 56. This makes it possible to construct the braking mechanism 60 in the simple manner with the minimized number of parts or components required therefor. Further, in the illustrated embodiment the braking mechanism 60 is provided with a frictional braking section 74 as described above which is simple in structure. As a result, braking force can be adjusted or determined easily.

Further, since both the first and second groups of pinch rollers 54 and 56 are constructed such that torque exerted thereon by way of the braking mechanism 60 is determined smaller than the torque corresponding to the maximum static frictional force which is developed between the cut paper P and the pinch rollers 54 and 56, it results that a relation as represented by an inequality $F_1-F_2<F_1$ is normally established between braking force $F_2$ and frictional transportation force $F_1$ and thereby there is no fear of causing slippage of the cut paper P between both the first and second groups of pinch rollers 54 and 56. This means that an occurrence of such a malfunction as contamination of the transferred surface of cut paper due to rubbing contact between the latter and the pinch rollers, damage or injury of the transferred surface or the like can be inhibited.

Further, since both the groups 54 and 56 of pinch rollers are equally distributed relative to the center of rotation, it is assured that contact pressure existent between the platen roller 31 and the groups of pinch rollers can be maintained more uniformly. This leads to an advantageous feature that an occurrence of skewing of cut paper to be transported while it is firmly held therebetween can be prevented more reliably. Further, another advantageous feature of the apparatus of the invention is that incorrect registering during superimposed transference can be more reliably inhibited from occurrence.

The present invention has been described above with respect to a few preferred embodiments, but it should of course be understood that it should not be limited only to them and various changes or modifications may be made in any acceptable manner without any departure from the spirit and scope of the invention.

For instance, material to be image transferred should not be limited only to cut paper. Alternatively, it may be a continuous strip of paper.

In the above-described embodiment, pinch rollers are employed for the apparatus as member or means adapted to follow rotation of the platen roller while material to be image transferred is held or clamped therebetween. However, the present invention should not be limited only to pinch rollers. Alternatively, an endless belt may be employed for the same purpose which is driven while it is kept in the tensioned state.

Moreover, one direction rotation limiting members and rotational force transmission limiting members should not be limited only to a one-way clutch. Alternatively, the latter may be replaced with a ratchet mechanism or the like means.

In all the first to third embodiments as described above, description has been made as to the case where the present invention is applied to a color printer for carrying out superimposed transference using a plurality of coloring agents while material to be image transferred is reciprocably transported. However, the present invention should not be limited only to such a color printer but it should of course be understood that it can be applied to a conventional mono-color printer. More particularly, in the case where the present invention is applied to such a conventional mono-color printer, an apparatus for embodying the invention may include a clamping member (for instance, pinch roller) for firmly clamping paper (which may be a thermally sensitive recording paper in this case) between the platen roller and the clamping member at the position located rearwardly as seen in the direction of transportation of paper for the purpose of transferring or recording so that braking force is exerted on the clamping member. As a modified form of the foregoing structure, the mechanism for allowing braking force to be exerted on the clamping member may be designed and constructed in the same manner as in the case of the apparatus according to the first to third embodiments. In this case, an occurrence of skewing, loosening or the like of paper is inhibited without fail and thereby a good image without incorrect registering, deformation or the like recognized thereon can be successfully transferred, recorded or built, as required.

Further, when the present invention is applied to a color printer in accordance with any of the first to third embodiments as described, there is no necessity for activating braking force on paper during the step of backward transportation of the latter, as long as the coloring agent is correctly registered on paper or suitable means is provided for assuring that correct registering is achieved. Specifically, the apparatus of the invention assures that highly stable overlapped transference is carried out without any occurrence of such a malfunction as incorrect registering, deforming or the like by employing such a mechanism adapted to exert braking force on clamping members for paper and platen roller located behind as seen in the direction of transportation of paper during the step of transferring operation as in the case of a conventional mono-color printer adapted to exert braking force on paper from the rear side only during the step of forward transportation of paper.

Finally, it should be noted that for the purpose of simplification the present invention has been typically described above with respect to thermal transferring type or thermal recording type printer with a thermal head incorporated therein as recording head. However, the present invention should not be limited only to this. The present invention can be applied to all apparatuses of the type for building and recording a certain image on moving recording medium, for instance, laser printer, ink jet type printer, hammer type printer or the like apparatus.

What is claimed is:

1. An image building apparatus for transferring an image onto a sheet-shaped recording medium, comprising:

image transferring means including a recording head having a contact portion, a rotatable platen roller, holding means for applying a transporting frictional force between the recording medium and said platen roller to convey the recording medium between said platen roller and said recording head, and means for rotating said platen roller in a forward rotational direction and a reverse rotational direction to reciprocably convey the recording medium between said platen roller and said recording head in a forward conveying direction and a reverse conveying direction corresponding, respectively, to said forward and reverse rotational directions of said platen roller, said recording head being movable relative to said platen roller to cause said contact portion of said recording head to come into and out of pressure contact with said platen roller so that an image is built on the recording medium as the recording medium is reciprocably conveyed between said platen roller and said recording head; and braking means for retaining tension in the recording medium between said platen roller and said recording head by applying a braking frictional force to the recording medium upstream of said contact portion of said recording head with respect to both the forward and reverse conveying directions of the recording medium, said braking frictional force being less than said transporting frictional force.

2. The apparatus of claim 1, wherein:

said holding means includes a pair of rotatable pinch rollers positioned on opposite sides of said platen roller, each of said pinch rollers having a shaft portion and a surface adapted to clamp the recording medium against said platen roller so that said transporting frictional force is applied between the recording medium and said platen roller; and said braking means includes one-way means for preventing rotation of said pinch roller positioned upstream of said contact portion of said recording head with respect to the conveying direction of the recording medium and for applying said braking frictional force to the recording medium.

3. The apparatus of claim 2, further comprising means for positioning said pinch rollers against said platen roller, said pinch roller positioning means including two pairs of pivotable swing levers each having a pivot point and a first end, wherein each of said pinch rollers is rotatably mounted between said first ends of an individual pair of said swing levers.

4. The apparatus of claim 3, wherein said pinch roller positioning means further includes spring means connected to said swing levers for urging said pinch rollers toward said platen roller.

5. The apparatus of claim 3, wherein said one-way means includes a pair of one-way clutches mounted on the shaft portion of each of said pinch rollers.

6. The apparatus of claim 5, wherein each of said one-way clutches is fixed to said first end of one of said swing levers.

7. The apparatus of claim 5, wherein said braking means further includes two pairs of clutch housings rotatable through a predetermined play angle, each of said clutch housings being fixed to one of said one-way clutches and being pivotable with respect to said swing arms.

8. The apparatus of claim 7, wherein each of said clutch housings includes a free end having two pawls, and said braking means further includes stopper means disposed between said two pawls of each of said clutch housings for engaging said pawls to limit the rotation of said clutch housings to said predetermined play angle.

9. The apparatus of claim 8, wherein the axis of said platen roller, the axes of said one-way clutches, and said stopping means are substantially co-planar and substantially orthogonal to said swing arms when said pinch rollers are in pressure contact with said platen roller.

10. The apparatus of claim 2, 3, 4, 5, 6, 7, 8, or 9 wherein said surfaces of said pinch rollers adapted to clamp the recording medium between said pinch rollers and said platen roller are coated with a contact layer of non-adhesive material.

11. The apparatus of claim 10, wherein said non-adhesive material is a fluoride-based resin.

12. The apparatus of claim 10, wherein said non-adhesive material is silicon rubber.

13. The apparatus of claim 1, wherein said holding means includes first and second pinch roller means positioned on opposite sides of said platen roller, each of said first and second pinch roller means including at least one rotatable pinch roller in pressure contact with said platen roller, and wherein said braking means includes:

first and second rotatable follower discs;

first one-way means for rotatably connecting said first follower disc to said pinch roller of said first pinch roller means when said first pinch roller means is upstream of said contact portion of said recording head with respect to the conveying direction of the recording medium and for rotatably disconnecting said first follower disc from said pinch roller of said first pinch roller means when said first pinch roller means is downstream of said contact portion of said recording head;

second one-way means for rotatably connecting said second follower disc to said pinch roller of said second pinch roller means when said second pinch roller means is upstream of said contact portion of said recording head with respect to the conveying direotion of the recording medium and for rotatably disconnecting said second follower disc from said pinch roller of said second pinch roller means when said second pinch roller means is downstream of said contact portion of said recording head; and first and second stationary discs in frictional contact with said first and second follower discs respectively, said first follower disc rotating relative to said first stationary disc and applying a braking torque to said pinch roller of said first pinch roller means when said first pinch roller means is upstream of said contact portion of said recording head, and said second follower disc rotating relative to said second stationary disc and applying a braking torque to said pinch roller of said second pinch roller means when said second pinch roller means is upstream of said contact portion of said recording head.

14. The apparatus of claim 13, wherein said first and second one-way means include one-way clutches.

15. The apparatus of claim 13, wherein the frictional force between said pinch roller and the recording medium applied by said braking torque is less than the maximum static frictional force said pinch roller and the recording medium.

* * * * *